United States Patent [19]

Markiewitz et al.

[11] 4,058,656

[45] Nov. 15, 1977

[54] FREE RADICAL POLYMERIZATION PROCESS EMPLOYING SUBSTITUTED AMINO ACETIC ACID DERIVATIVES

[75] Inventors: Kenneth H. Markiewitz; Alfred J. Restaino, both of Wilmington, Del.

[73] Assignee: ICI United States Inc., Wilmington, Del.

[21] Appl. No.: 673,938

[22] Filed: Apr. 5, 1976

[51] Int. Cl.² .................. C08F 4/32; C08F 20/06; C08F 20/34; C08F 20/56
[52] U.S. Cl. .................. 526/215; 526/209; 526/210; 526/303; 526/312; 526/317; 526/321; 526/328; 526/330; 526/335; 526/341; 526/343; 526/346
[58] Field of Search ............... 526/215, 209, 210, 303, 526/312, 317, 321, 328, 330, 335, 341, 343, 346

[56] References Cited

U.S. PATENT DOCUMENTS

| | | | |
|---|---|---|---|
| 2,380,591 | 7/1945 | Fryling | 526/215 |
| 3,312,678 | 4/1967 | Crano | 526/215 |

*Primary Examiner*—Harry Wong, Jr.

[57] ABSTRACT

Initiating compounds having the following formula:

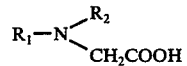

wherein $R_1$ in an substituted or unsubstituted aryl radical and wherein $R_2$ is hydrogen or alkyl are useful in initiating polymerization reaction of ethylenically unsaturated monomers susceptible to free radical polymerization.

15 Claims, No Drawings

FREE RADICAL POLYMERIZATION PROCESS EMPLOYING SUBSTITUTED AMINO ACETIC ACID DERIVATIVES

FIELD OF THE INVENTION

This invention concerns the polymerization of ethylenically unsaturated polymerizable monomers susceptible to free radical polymerization. Specifically the invention concerns novel methods for initiating polymerization of such monomers and monomer systems containing inactive initiators which initiators may be activated to polymerize the system.

DESCRIPTION OF THE PRIOR ART

Polymerization of ethylenically unsaturated monomers may be initiated by several methods well known to the art. Some of these include the use of high energy electromagnetic radiation such as gamma radiation and x-rays, ultraviolet light radiation, chemical initiators, and thermal means. Many polymerization reactions depend upon the formation of free radicals to cause the initiation of the polymerization. The use of free radical producing agents containing an acetic acid group has been disclosed in Chambers' U.S. Pat. No. 3,479,185. The Chambers patent discloses for example the use of a system of N-phenyl glycine or N,N,N',N',-ethylenediamino tetraacetic acid in combination with a 2,4,5-triphenylimidazolyl dimer as a photopolymerization catalyst.

It has now been discovered however that certain N-substituted aromatic imino monoacetic compounds produce free radicals and provide for excellent and versatile initiators without the additional presence of a dimer.

An additional advantage of the initiators of the present invention is their versatility in that they can cause polymerization in presence or absence of air, oxygen, heat, visible or ultraviolet light. While such sources of radiation energies are therefore not required, the presence of them as promoters will tend to increase the activity of the initiator and consequently the rate of polymerization.

SUMMARY OF THE INVENTION

According to the invention there is therefore provided a method of polymerizing a monomer system containing one or more ethylenically unsaturated compounds susceptible to free radical polymerization which comprises initiating polymerization by contacting the system with an effective amount of a dissolved initiator consisting essentially of a compound of the formula:

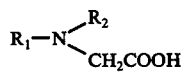

where $R_1$ is a substituted or unsubstituted aryl radical and $R_2$ is hydrogen, or an alkyl group provided that the ethylenically unsaturated compounds do not contain any group with which the acid group of the initiator will preferentially react chemically (as hereinafter defined). According to the invention there is also provided a monomer system susceptible to free radical polymerization which comprises one or more ethylenically unsaturated monomers and a dissolved initiator consisting essentially of a compound of the formula

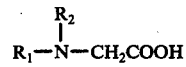

wherein $R_1$ is a substituted or unsubstituted aryl radical and $R_2$ is hydrogen or an alkyl group, or a salt of said compound which salt upon acidification will yield said compound, provided that the ethylenically unsaturated monomers do not contain any group with which the acid group of the compound will preferentially react chemically. By aryl is meant a monovalent radical containing an aromatic ring wherein the free valence is on a carbon atom of the aromatic ring.

DESCRIPTION OF THE INVENTION

An important aspect of the invention requires that the initiator must be soluble in at least one phase of the polymerizable system. This polymerizable system maybe an emulsion suspension or solution polymerizable system. Often the initiator is soluble in the polymerizable monomer or monomers and no additional solvent is required. Alternatively in a polymerizable system where the initiator is not directly soluble in the monomer, the system must comprise a solvent such as for example, water or methanol for the initiator. The term "dissolved initiator" is therefore meant to include initiators dissolved in the polymerizable monomer and initiators dissolved in a solvent.

The initiators which are useful in the practice of the invention include:

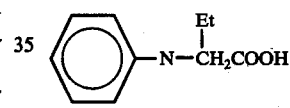

N-(Carboxymethyl)-N-ethylaniline

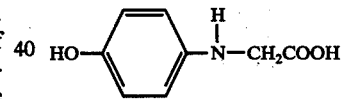

N-(carboxymethyl)-4-hydroxyaniline

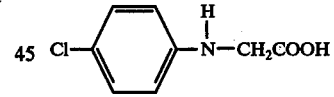

N-(carboxymethyl)-4-chloroaniline

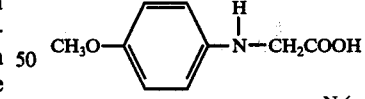

N-(carboxymethyl)-4-methoxyaniline

N-(carboxymethyl)-4-t-butylaniline

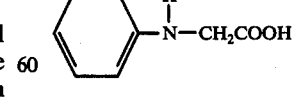

N-(carboxymethyl)aniline

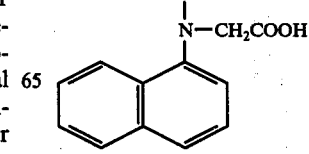

(1-naphthylimino)acetic acid

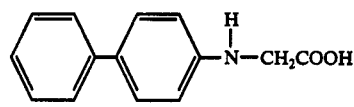

[(1,1'-biphenyl)-4-ylimino]acetic acid

Preferred initiators are those wherein $R_1$ has the formula wherein R is hydrogen, alkyl, alkoxy, phenyl, aralkyl or alkaryl.

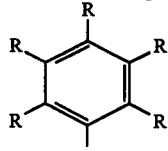

The initiators useful in the process of the invention may be prepared by reacting in an aqueous solution the corresponding amine component with a slight excess of sodium chloroacetate at elevated temperatures. During the reaction, which is usually complete in 2 hours at reflux, the pH of the reaction mixture is carefully controlled at about 7 by the addition of sodium hydroxide. After the reaction is completed the product may usually be obtained as the inactive sodium salt by stripping or alternatively as an active precipitate by acidification such as with hydrochloric acid. In instances where precipitation will not occur after acidification, extraction procedures may be employed to obtain the product.

Monomer

The unsaturated materials which may be polymerized by the practice of this invention are ethylenically unsaturated compounds susceptible to free radical polymerization. These compounds include esters, nitriles and organic halogen compounds which are olefinically unsaturated compounds of both aromatic and aliphatic types. By way of illustration, vinyl esters such as vinyl acetate, vinyl propionate, vinyl butyrate, vinyl isobutyrate, and other vinyl esters containing as many as 18 or more carbon atoms in the acid moiety, may be polymerized in accordance herewith.

Other vinyl derivatives such as vinyl chloride, vinyl fluoride, chlorotrifluoroethylene, tetrafluoroethylene, butadiene nitroethylene, methyl vinyl ketone, methyl isopropenyl ketone, butyl vinyl sulfone, vinyl triethoxy silane, ethyl vinyl sulfoxide, styrene, nuclear substituted styrenes including o-methyl, m-methyl, p-methyl styrene, divinylbenzene, and other related compounds may also be polymerized in accordance herewith. Vinylidine derivatives, viz., vinylidene chloride, and vinylidene carbonate respond to this polymerization also.

The acrylates respond particularly well to the techniques disclosed herein and the invention extends to include acrylates and methacrylates containing up to 18 or more carbon atoms such as ethyl acrylate, propyl acrylate, butyl acrylate, cyclohexo acrylate, cyclohexo methacrylate, isobutyl acrylate, decyl acrylate, dodecyl methacrylate, methyl methacrylate, benzyl acrylate, tetrahydrofurfuryl acrylate, 2-methoxyethyl acrylate, methyl chloroacrylate, pentaerythritol triacrylate, neopentylglycol diacrylate, ethyleneglycol acrylate phthalate, 2-hydroxypropyl methacrylate, 2-hydroxyethyl acrylate and other related compounds such as acrylamide, acrylic acid, methacrylic acid respond to treatment set forth herein.

Other materials susceptible to the practice hereof include: acrylonitrile, methacrylonitrile, 2-chloroacrylonitrile, and allyl esters, such as the bisallyl biscarbonate ester of diethylene glycol.

Copolymers of the aforementioned unsaturated materials may be obtained. Among the copolymers which may be prepared in accordance herewith are: copolymers of butadiene, acrylonitrile, vinyl acetate, vinylidene chloride, methyl acrylate, and divinylbenzene with styrene, and one another. Copolymers of butadiene with styrene, butadiene with acrylonitrile, acrylic acid with acrylamide, vinyl acetate with vinylidene chloride, styrene with methyl acrylate, and styrene with divinylbenzene, are examples of specific copolymers which may be prepared pursuant to this invention. Terpolymers prepared in accordance herewith are often of special utility, such as those derived from butadiene, acrylonitrile, styrene mixtures and other mixtures wherein vinyl acetate, or methyl methacrylate may be components of the terpolymers.

Preferred monomer systems of the present invention are those containing water soluble monomers such as acrylamide, diacetone acrylamide, acrylic acid, methacrylic acid; monomers such as diethylaminoethyl methacrylate, dimethylaminoethyl methacrylate or dimethylaminoethyl acrylate and their derivatives; vinyl monomer systems containing unsaturated maleate and fumarate polyesters; monomers containing acrylate or methacrylate unsaturation either separately or in combination with comonomers such as styrene, methyl methacrylate, acrylonitrile, vinyl acetate or vinylidene chloride, and latex forming systems containing butadiene either alone or in combination with copolymerizable vinyl monomers such as styrene, acrylonitrile, vinyl acetate or vinylidene chloride.

The initiators of the invention have different effectiveness in different polymerization media, which may be aqueous or organic in nature. Most of the initiators are soluble in organic media. However, in aqueous media the selection of the best initiator is best determined experimentally. In general the least substituted aromatic monoacetic acid initiator is water soluble. As groups are substituted on the molecules, initiators may lose water solubility. N-phenylglycine was found soluble in aqueous solutions whereas N-carboxymethyl-4-t-butyl aniline was not found soluble in aqueous media.

The ethylenically unsaturated monomers which are polymerizable according to the method of the invention should not contain any group with which the acid group of the initiator will preferentially react chemically. For example, monomer substituents such as for example, amines, isocyanate or vinyl epoxy groups are highly reactive with the acid groups of the initiator. Such substituents, if present, will derivatise the acid groups to amides or esters. While amine substituents may cause derivation reactions which may be reversible by acidification, substituents such as isocyanate or vinyl epoxy groups will cause irreversible reactions which will permanently diminish or terminate the ability of the initiators to generate free radicals. By the phrase "groups with which all the acid groups of the initiator will preferentially react chemically" is therefore meant those highly reactive groups which will non-reversibly derivatise all the acid groups of the initiator.

As is well known to those skilled in the art, free radical polymerization refers to those polymerization reactions which take place through intermediates having an odd number of electrons and, consequently, an unpaired electron. It is these intermediates which are generally referred to as free radicals. The free radicals are normally generated in one or more of a variety of ways such as by the decomposition of a chemical initiator added to the polymerizable mixture or by the application of heat or ionizing radiation to the composition. If the free radical is generated in the presence of an ethylenically unsaturated monomer described above, the radical will add to the double bond with the regeneration of another radical. This radical will, in turn, react with another monomer and in the course of the reaction generate another free radical resulting in growth of the polymer chain through the addition of one chain to another. Free radical polymerization is described in detail in, for example, the *Encyclopedia of Polymer Science and Technology*, Vol. 7, pages 361–431, Interscience Publishers, 1967, and in the *Textbook of Polymer Science*, Billmeyer, Interscience Publishers, 1962, pages 262–290.

In addition to growth of the polymer chain, several side reactions can also take place during the course of the polymerization reaction. One of these, identified as chain transfer refers to the transfer of an atom from a molecule to a free radical in the reaction mixture. Depending upon the nature of the other material, this can result in the formation of additional polymer molecules, the formation of branch chain polymers, or in termination of the polymerization reaction on a growing radical chain.

Chain transfer agents do not terminate the polymerization reaction entirely but merely terminate a growing chain and allow the polymerization to start elsewhere. If premature termination of the growing polymer chain occurs, a reduced molecular weight results and other polymer properties are achieved. It is, for this reason, desirable to include in a free radical polymerization system a chain transfer agent which would function in this manner allowing molecular weight control.

The concentration of the various components utilized in the production of polymers in accordance with the invention may be varied over extremely wide ranges and appears to be not narrowly critical. The concentration of the initiator is dependent on the activity of the initiator used; the type and concentration of other components such as solvent and monomer; and promoters such as heat and light. Although a concentration range of from 0.01 to 2% is economically preferred for optimum monomer conversion, under favorable conditions shown hereafter in the examples, any amounts which are effective may be used eg. initiator concentration of as low as 0.01% by weight of monomer system and as high as 9% or more by weight of monomer system may be used successfully. For example in nonaqueous systems the activity of p-toluidine acetic acid is greater than an initiator having an unsubstituted aromative ring such as aniline acetic acid. Hence the concentration of a greatly active initiator may be less than those of less active initiators. In general in the presence of air, oxygen or other polymerization inhibitors, larger amounts of initiator may be required.

The temperature used in the practice hereof may vary widely and are only limited by the freezing and boiling point of the polymerizable system. In aqueous systems the polymerization may be conducted between about 0° and 100° C. Nonaqueous media such as styrene or isopropyl methacrylate may allow for polymerization temperatures as high as about 125° C. Other nonaqueous media may allow for polymerization temperatures of 200° C or higher.

The invention does not exclude the utilization of polymerization inhibitors, accelerators and molecular weight modifiers. Any of these may be employed if so desired. Inhibitors may include any free radical scavenger.

The polymerization process according to the invention may occur over a wide range of pH. The optimum pH of the polymerizable system will be affected by the stability of the monomer and the solubility and stability of the initiator.

It has also been discovered that the initiators are considerably less active when not substantially in the acid form. The activity of the initiator and thus the rate of polymerization may therefore be regulated by adjustment of pH. As a further advantage, the invention therefore provides for a latent polymerizable system by having the initiators present not in the acid form but as the inactive salt, for example, an alkali metal salt such as the sodium salt, or an inactive amine. Such a latent system may then be activated by the simple adjustment of pH within a range of 1 to 9 to a point below the neutralization point of the system. The neutralization point is hereby defined as the pH point of the polymerizable system at which the initiator becomes active due to the presence of acid group. Generally the lower the pH of the polymerizable system, the more active the initiator and conversely the higher the pH, the slower the rate of polymerization will be. It should be noted that the neutralization point of the polymerizable system will vary depending on the specific initiator employed.

A particular advantage of a latent polymerizable system is the ability to polymerize a liquid polymerizable system at any time in situ merely by the addition of acid to lower the pH of the system. For example, in oil recovery operations a water soluble monomer mixture of sodium acrylate and acrylamide and an inactive salt of an initiator may be introduced into an oil bearing formation as a low viscosity liquid and subsequently polymerized by the addition of acid to activate the initiator to produce a highly viscous polymer solution in situ. The invention also provides for a method as described hereinbefore but wherein the ethylenically unsaturated compounds are acrylamide and acrylic acid and wherein the pH is adjusted to a range of 3 to 5.

The invention also provides for a polymerizable system containing additionally a second free radical polymerization initiating system such as for example, a peroxide system to cause postcuring.

The invention is further illustrated by the following examples in which all parts and percentages are by weight unless otherwise specified.

EXAMPLE 1

To a solution of 2 g of acrylamide in 8 ml of distilled water were added 20 mg of N-ethyl anilineacetic acid. The solution polymerized in 14 hours at room temperature while being exposed to laboratory day light.

EXAMPLE 2

To a solution of 2 g of acrylamide in 8 g of methanol were added 100 mg N-phenylglycine. The solution polymerized in 9 hours at room temperature while being exposed to laboratory day light. A sample not containing N-phenylglycine, acting as control, did not polymerize.

EXAMPLE 3

To a solution of 2 g acrylamide in 8 g of methanol were added 50 mg N-phenylglycine. The solution polymerized in 17 hours at room temperature while being exposed to laboratory day light. A sample not containing N-phenylglycine, acting as control, did not polymerize.

EXAMPLE 4

To a solution of 1 g acrylamide in 4 g of methanol were added 200 mg N-phenylglycine. The solution was kept at room temperature in the dark. A precipitate indicating polymerization formed within three days. A sample not containing N-phenylglycine, acting as control, did not polymerize.

EXAMPLE 5

To a solution of 1 g acrylamide in 4 g of water were added 100 mg N-phenylglycine. The solution was kept at room temperature in the dark. The solution polymerized within three days. A sample not containing N-phenylglycine, acting as control, did not polymerize.

EXAMPLE 6

To a solution of 1 g acrylamide in 4 g of water were added 100 mg N-phenylglycine. The pH was adjusted with dilute hydrochloric acid to 1. The solution was kept at room temperature in the dark. The solution polymerized within 60 hours. A sample not containing N-phenylglycine, acting as control, did not polymerize.

EXAMPLE 7

To a solution in a glass container of 2 g acrylamide in 8 g of methanol were added 50 g N-phenylglycine. The pH was adjusted with dilute hydrochloric acid to 2. After exposure of the solution to laboratory daylight for 14 hours at room temperature polymerization was observed. A sample not containing N-phenylglycine, acting as control, did not polymerize.

EXAMPLE 8

To a solution containing 3 grams of acrylamide and 1.5 grams of sodium chloride in 5.5 g water, were added 200 mg N-phenylglycine. The solution was kept at room temperature in the dark. The solution polymerized within three days. A sample not containing N-phenylglycine, acting as control, did not polymerize. The molecular weight of the polyacrylamide produced in the presence of sodium chloride was found to be higher than that produced without the presence of the salt.

What is claimed is:

1. A polymerizable system susceptible to free radical polymerization which comprises one or more ethylenically unsaturated compounds and a salt of an initiator consisting essentially of a compound of the formula:

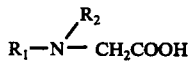

wherein $R_1$ is a substituted or unsubstituted aryl radical, and $R_2$ is hydrogen or alkyl, which salt will yield a dissolved initiator compound of the said formula upon acidification, provided that the ethylenically unsaturated compounds to not contain any group with which the acid group of the initiator compound will preferentially react chemically.

2. A polymerizable system as claimed in claim 1 wherein the initiator compound is N-(carboxymethyl)-aniline.

3. A polymerizable system as claimed in claim 1 wherein the salt of the initiator compound is an alkali metal salt.

4. A polymerizable system as claimed in claim 1 wherein the salt of the initiator compound is an amine salt.

5. A polymerizable system as claimed in claim 1 wherein the ethylenically unsaturated compounds are selected from class consisting of acrylamide, acrylic acid, methacrylic acid, diethylaminoethyl methacrylate, dimethylaminoethyl methacrylate, dimethylaminoethyl acrylate, maleate or fumarate polyester, butadiene, styrene, methyl methacrylate, acrylonitrile, vinyl acetate and vinylidene chloride.

6. A method of polymerizing a polymerizable system containing one or more ethylenically unsaturated compounds susceptible to free radical polymerization which comprises initiating polymerization by contacting the system with an effective amount of dissolved initiator consisting essentially of a compound of the formula

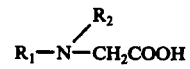

where $R_1$ is substituted or unsubstituted aryl radical, and $R_2$ is hydrogen or alkyl provided that the ethylenically unsaturated compounds do not contain any group with which the acid group of the initiator will preferentially react chemically.

7. A method as claimed in claim 6 wherein the system is contacted by a salt of the initiating compound which salt upon acidification will yield said compound and where the system is subsequently acidified.

8. A method as claimed in claim 7 wherein the acidification is effected by pH adjustment of the system to within a range of 1-9.

9. A method as claimed in claim 7 wherein the salt is an alkali metal salt.

10. A method as claimed in claim 7 wherein the salt is an amine salt.

11. A method as claimed in claim 7 wherein the ethylenically unsaturated compounds are acrylamide and acrylic acid and wherein the pH is adjusted to a range of 3 to 5.

12. A method as claimed in claim 7 wherein the ethylenically unsaturated compounds are selected from class consisting of acrylamide, acrylic acid, methacrylic acid, diethylaminoethyl methacrylate, dimethylaminoethyl methacrylate, dimethylaminoethyl acrylate, maleate or fumarate polyester, butadiene, styrene, methyl methacrylate, acrylonitrile, vinyl acetate and vinylidene chloride.

13. A method as claimed in claim 7 wherein the ethylenically unsaturated compound is maleate or fumarate polyester.

14. A method as claimed in claim 6 wherein the ethylenically unsaturated compounds are additionally contacted with a second free radical initiator.

15. A method as claimed in claim 14 wherein the second free radical initiator is a peroxy compound.